US00RE35731E

United States Patent [19]

Lach

[11] E Patent Number: Re. 35,731

[45] Reissued Date of Patent: Feb. 17, 1998

[54] FLAG POLE BRACKET

[75] Inventor: Robert L. Lach, Cincinnati, Ohio

[73] Assignee: New Creative Enterprises, Inc., Cincinnati, Ohio

[21] Appl. No.: 306,662

[22] Filed: Sep. 15, 1994

Related U.S. Patent Documents

Reissue of:

[64] Patent No.: 5,269,488
Issued: Dec. 14, 1993
Appl. No.: 938,209
Filed: Aug. 31, 1992

[51] Int. Cl.[6] ..... A01K 97/10

[52] U.S. Cl. ..... 248/535; 248/512; 248/538

[58] Field of Search ..... 248/512, 513, 248/514, 518, 534, 535, 538

[56] References Cited

U.S. PATENT DOCUMENTS

| | | | |
|---|---|---|---|
| 466,960 | 1/1892 | Bert et al. . | |
| 545,385 | 8/1895 | Simpson et al. . | |
| 610,738 | 9/1898 | Finnegan . | |
| 981,603 | 1/1911 | Adelson | 248/538 |
| 1,025,904 | 5/1912 | Earhart . | |
| 1,053,255 | 2/1913 | Ward | 248/538 |
| 1,103,257 | 7/1914 | Bollinger, Jr. | 248/512 |
| 1,198,840 | 9/1916 | Hanck et al. | 248/534 |
| 1,737,151 | 11/1929 | Derbyshire | 248/538 |
| 2,174,140 | 9/1939 | Schofield . | |
| 2,914,278 | 11/1959 | Burke . | |
| 3,047,262 | 7/1962 | Ripich | 248/538 |
| 3,920,207 | 11/1975 | Adamaitis | 248/538 |
| 4,593,877 | 6/1986 | van der Wyk | 248/538 |

*Primary Examiner*—Kenneth E. Peterson
*Attorney, Agent, or Firm*—Wood, Herron & Evans, L.L.P.

[57] ABSTRACT

A supporting bracket for hanging decor such as decorative flags, banners, windsocks and planters, which is designed for attachment to a flat surface. The bracket includes a base portion and several elongated receptors for receiving a cylindrical pole to which the decor is attached. The bracket design is such that it is capable of accommodating different sized poles and displaying the decor at different angles. The bracket also includes screw holes for mounting to a planar surface and a set screw for securing the support shaft within the bracket.

31 Claims, 2 Drawing Sheets

FLAG POLE BRACKET

Matter enclosed in heavy brackets [ ] appears in the original patent but forms no part of this reissue specification; matter printed in italics indicates the additions made by reissue.

FIELD OF THE INVENTION

The present invention relates to an apparatus for mounting hanging decor such as decorative flags, banners, windsocks and planters on a planar surface.

BACKGROUND OF THE INVENTION

In recent years flags and banners have become a very fashionable form of decorating homes, offices, retail stores, and other buildings. As a result, a need has evolved for a mounting bracket which is both decorative and easily adapted for supporting a variety of hanging decor, in a variety of positions. The prior art discloses flag or banner pole mounting brackets which are generally comprised of a weighted base or pipe with a single flag pole receptor designed for displaying the flag or banner in a fixed position. Such brackets lack both an aesthetically pleasing appearance, and lack versatility. Some adjustable brackets have been designed but they are generally cumbersome or lacking in sufficient strength to support the standard flag pole shaft.

Additionally, hanging windsocks have similarly enjoyed recent popularity. Windsocks, however, tend to hang from smaller poles than do flags. Accordingly, typical flag pole brackets are often unsuitable for such windsocks.

THE OBJECT AND SUMMARY OF THE INVENTION

Therefore, it is an object of the present invention to provide a flag or banner pole mounting bracket which is simple, aesthetically pleasing, and versatile. The invention meets this object with an apparatus comprising a base portion that includes means for mounting the bracket on a planar surface, and three separate elongate receptor means.

The first elongate receptor means can receive a hanging decor supporting shaft, and is located adjacent to the base with its longitudinal axis oriented obliquely with respect to the bag and the planar surface upon which the base is mounted. The second receptor means can likewise receive a hanging decor supporting shaft and is located adjacent to the base. Its longitudinal axis is also oriented obliquely with respect to the base and the planar surface upon which the base is mounted, but at a different angle from the first receptor means. Both the first and second receptor means include an anchor portion located in the base portion and a respective mouth portion located longitudinally outward from the anchor portion.

The third elongate receptor means is located adjacent to the base with its longitudinal axis parallel with the longitudinal axis of the first receptor means. Both the mouth portion and the anchor portion of the third receptor means are smaller than the mouth and anchor portions of the first and second receptor means and designed for receiving a third smaller hanging decor support shaft therein.

The foregoing and other objects, advantages and features of the invention and the manner in which these objects are accomplished will become apparent upon consideration of the following detailed description of the invention in conjunction with the accompanying drawings which illustrate the preferred and exemplary embodiments and wherein:

DETAILED DESCRIPTION OF THE DRAWINGS

Figure 1:
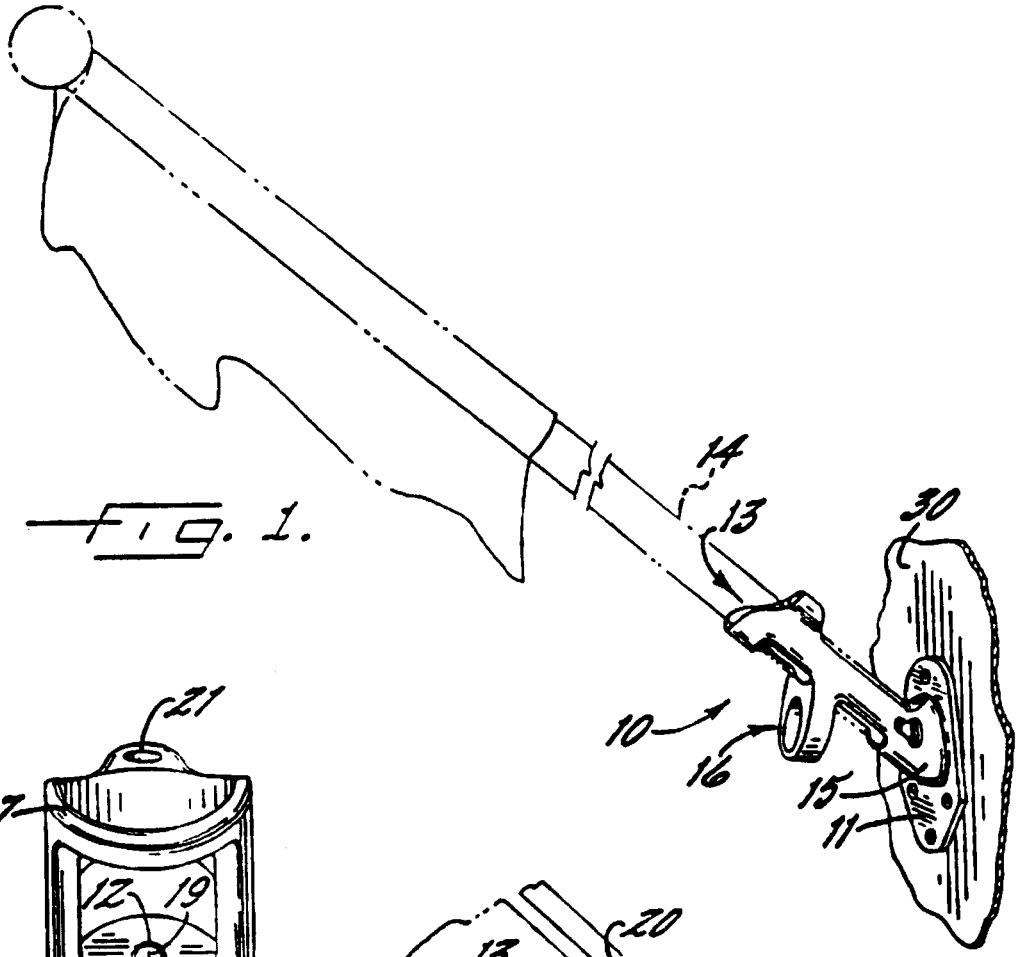
FIG. 1 is a perspective view of the apparatus of the present invention as it is mounted on a vertical planar surface.

FIG. 1 is a perspective view of a preferred embodiment of the supporting bracket broadly designated at 10 and is mounted on a vertical planar surface 30. The supporting bracket 10 is preferably comprised of a lightweight but sturdy metal such as aluminum, and includes a base portion with means for mounting the base portion on a vertical or horizontal planar surface. In the illustrated embodiment, the base portion is a flat plate 11 which includes a plurality of holes 12 designed for attaching the supporting bracket 10 to a planar surface using a plurality of screws 19 appropriate for the surface material.

The supporting bracket 10 also comprises a first elongate receptor means broadly designated at 13 which is adjacent and fixed to the plate 11 and designed for receiving a hanging decor supporting shaft or pole 14 therein. The first receptor means is oriented obliquely at approximately a 45° angle with respect to the plate 11 and the planar surface on which it is mounted. In this manner, and with the pole 14 inserted in the first receptor means 13, hanging decor will be displayed at approximately a 45° angle with respect to the plate 11 and the mounting surface.

Additionally, the supporting bracket 10 comprises a second elongate receptor means broadly designated at 16 which is also adjacent and fixed to the plate 11 and designed for receiving a pole 14. The second receptor means also has its longitudinal axis oriented obliquely with respect to the plate 11 and the planar surface on which the bracket 10 is mounted. The angle of the longitudinal axis of the second elongate receptor means 16 with respect to both the plate 11 and the planar surface on which it is mounted is [approximately 90°. In this way, when the bracket 10 is mounted on a vertical planar surface, as in FIG. 2, the pole 14 will be perpendicular to the planar surface and will extend horizontally, directly out from the surface. When the bracket 10 is mounted on a horizontal planar surface, the pole 14 will stand straight up vertically] *an obtuse angle.*

In a preferred embodiment, the first and second receptors 13 and 16 are of the same approximate diameter so that a pole suitable for receptor 13 will be similarly suitable for receptor 16.

Figure 2:
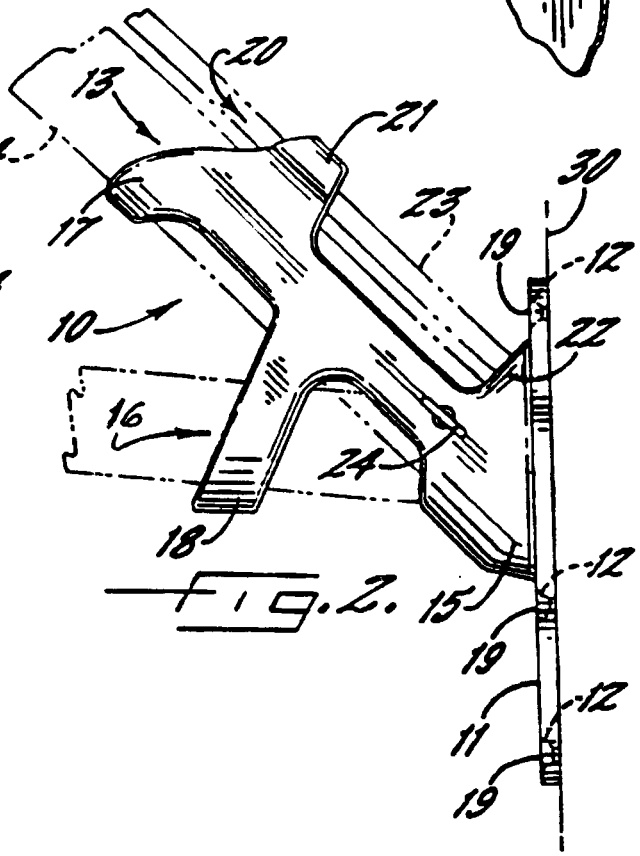
FIG. 2 is a side elevational view of the apparatus of the present invention as it is mounted on a vertical planar surface.

In the preferred embodiment, the first receptor means 13 and second receptor means 16 each comprise a respective anchor portion 15 and respective mouth portions 17 and 18. The anchor portion 15 is located in the base 11 and the respective mouth portions 17 and 18 are located longitudinally outwardly from the anchor portion. The mouth portion 17 of the first receptor means 13 has a curved top surface as shown in FIGS. 1 and 2 so that the frontal lip portion extends further up the underside of the pole 14 than the back portion, and thereby provides additional support to the underside of the pole 14. The support provided by the lip portion of the mouth 17 braces the pole 14 in the upright position when the bracket 10 is mounted on a vertical surface. The mouth portion 18 of the second receptor means 16 has a flat surface and depends obliquely from the central portion of the first receptor means 13 when the bracket 10 is mounted on a vertical planar surface as shown in FIG. 2.

In the illustrated embodiment, portions of each of the receptors 13 and 16 comprise open sides, to thereby minimize the weight of the bracket 10.

Additionally, the supporting bracket 10 comprises a third elongated receptor means 20 which is adjacent to the plate 11 and which has a longitudinal axis parallel with the longitudinal axis of the first receptor means 13. The third elongated receptor means 20 also has a respective mouth portion 21 and a respective anchor portion 22. The mouth 21 and anchor 22 portions are smaller in diameter than the mouth 17 and 18 and anchor 15 portions of both the first and second receptor means and are designed to accommodate a third, smaller hanging decor support shaft 23 therein, as is illustrated in FIG. 2.

In a preferred embodiment, the mouth portions of the first receptor means 17 and of the second receptor means 18 are both about one inch in diameter and the mouth portion of the third receptor means 21 is about ¼ inch in diameter. Each is also tubular in shape to accommodate cylindrical poles 14 and 23 therein. It will be understood however, that the invention is not limited to such sizes or to cylindrically shaped openings and poles.

The third receptor means 20 is located on the opposite side of the first receptor means 13 from the mouth portion 18 of the second receptor means 16. As a result, the mouth portion 21 of the third receptor means 20 is located directly above the mouth portion 17 of the first receptor means 13 when the bracket 10 is mounted on a vertical planar surface. Similarly, the anchor portion 22 of the third receptor means 20 is immediately adjacent the plate 11 and located directly above the common anchor portion 15 of the first and second receptor means 13 and 16 when the bracket 10 is mounted on a vertical surface.

For the purpose of securing the support shaft of the hanging decor in position when the shaft is in either the first receptor means 13 or the second receptor means 16, a set screw 24 is optionally provided which, when tightened, secures the pole 11 in position in the supporting bracket 10. The set screw 24 is particularly useful when the bracket 10 is used to hold poles somewhat smaller than the diameter of the receptor means.

Figure 3:
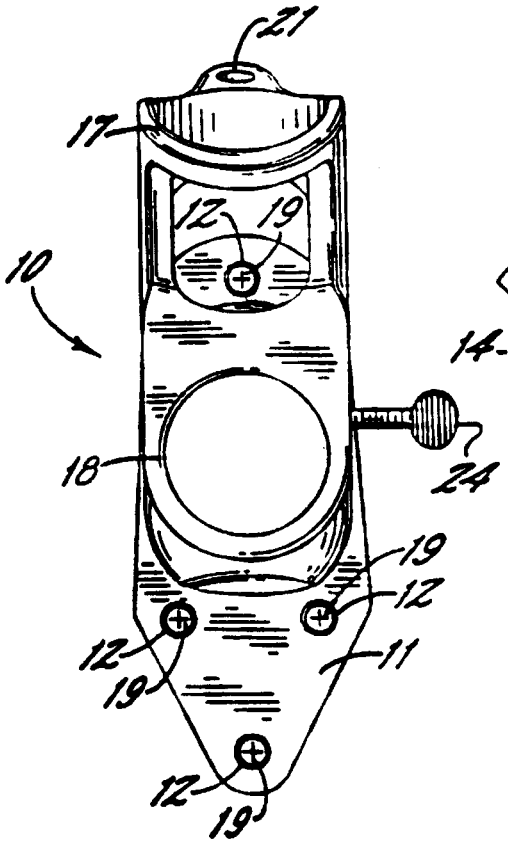
FIG. 3 is a front elevational view of the apparatus of the present invention.

In preferred embodiments, further features of the present invention include rounded edges which provide a smooth polished appearance to the bracket 10. Additionally, the plate 11 includes four screw holes 12, three of which are located at the bottom portion of the plate in a triangular formation and one of which is located at the top of the plate as is shown in FIG. 3. The plate is shaped so that when viewed from the front elevational position, as in FIG. 3, the lowest portion of the plate is narrower than the upper portions.

In a preferred embodiment, the widest point of the plate 11 is approximately one and one half to two inches wide, and the plate 11 is between four and five inches long. The first receptor means 13, which is the most extreme portion of the bracket 10, extends approximately four inches at the farthest point from the planar surface upon which it will be mounted. At its longest point, between the tip of the first receptor means 13 and the lowest portion of the plate 11 as measured by a straight line, the bracket 10 is between five and six inches long. The first receptor means 13 is approximately four inches long from its mouth portion 17 to its anchor portion 15. The second receptor means 16 is between two and three inches from its mouth portion 18 to its anchor portion 15. The plate 11 is ¼ inch in thickness. As stated earlier, however, these sizes are descriptive of preferred sizes of the present invention, and are not otherwise limiting of its scope.

Figure 4:
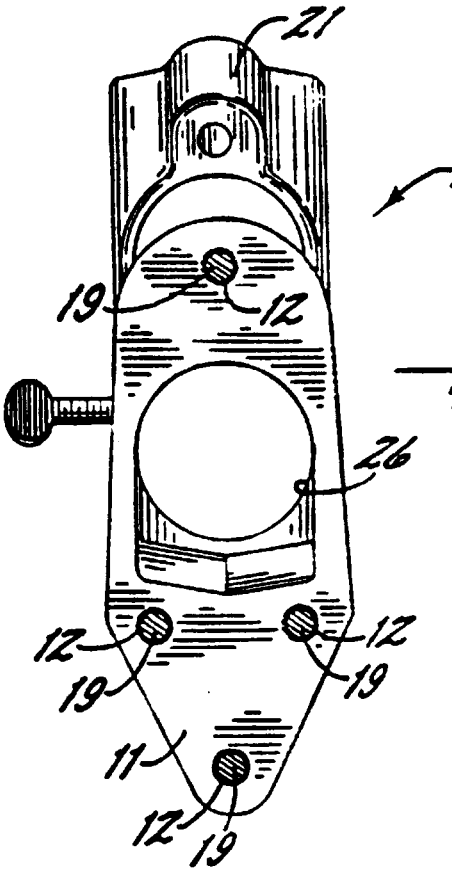
FIG. 4 is a rear elevational view of the apparatus of the present invention.
Figure 5:
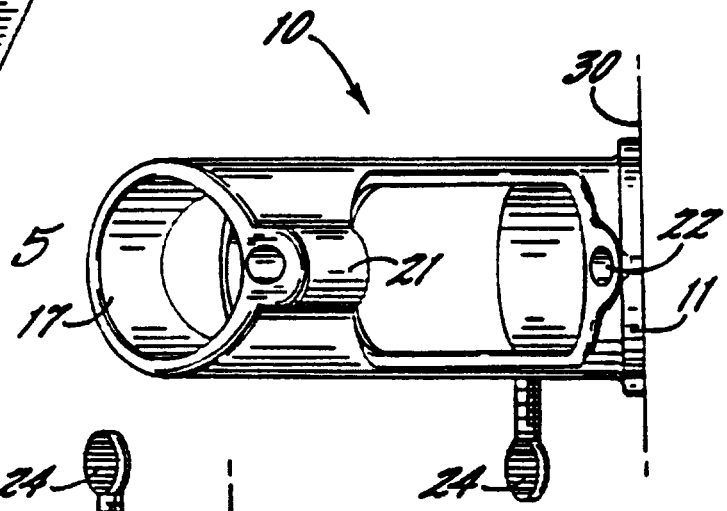
FIG. 5 is a top plan view of the apparatus of the present invention.
Figure 6:
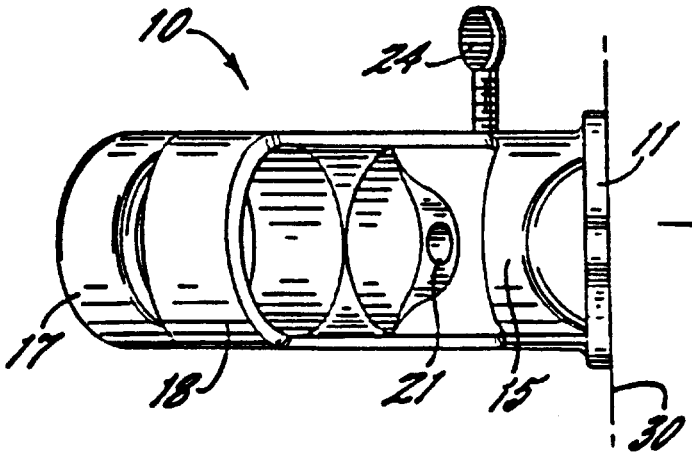
FIG. 6 is a bottom plan view of the apparatus of the present invention.

As best seen in the rear elevational view of FIG. 4, an opening 26 is provided in the plate 11 so that a pole 14 inserted in either the first receptor means 13 or the second receptor means 16 will abut the planar surface on which the bracket 10 is mounted. As shown in FIG. 4 the top portion of the opening 26 is rounded whereas the bottom edge is nearly flat, the sides also being straight rather than curved.

In the drawings and specification there have been disclosed typical preferred embodiments of the invention and although specific terms have been employed, they have been used in a generic and descriptive sense only and are not for purposes of limitation. The scope of the invention being set forth in the following claims.

That which is claimed is:

1. A supporting bracket for hanging decor such as decorative flags, banners, windsocks, and planters, and for being mounted on a generally planar surface, said bracket comprising:

a base portion including means for mounting said base portion on said planar surface;

first elongate receptor means adjacent said base portion for receiving a hanging decor supporting shaft therein, said receptor means having its longitudinal axis oriented obliquely with respect to said base portion and so that its longitudinal axis is also oblique to the surface upon which said base portion is mounted;

second elongate receptor means adjacent said base portion for receiving a hanging decor supporting shaft therein, said receptor means having its longitudinal axis oriented obliquely with respect to said base portion and with respect to the planar surface, but at a different angle than said first receptor means;

said first and second receptor means each comprising a respective anchor portion located in said base portion of said bracket and a respective mouth portion located longitudinally outwardly from said anchor portion; and third elongated receptor means adjacent said base portion and parallel with the longitudinal axis of said first receptor means, and having a respective anchor portion and a respective mouth portion, and wherein said third anchor portion and said third mouth portion are smaller than said mouth and anchor portions of said first and second receptor means, for receiving a third, smaller hanging decor support shaft therein.

2. A supporting bracket in accordance with claim 1 wherein said bracket is formed of metal.

3. A supporting bracket in accordance with claim 1 wherein said base portion has a flat face for being mounted flush against a planar surface.

4. A supporting bracket in accordance with claim 1 wherein said mounting means comprises a plurality of screw holes located on said base portion.

5. A supporting bracket in accordance with claim 1 wherein each of said first, second, and third elongated receptor means comprises a tubular framework for receiving a cylindrical hanging door supporting shaft therein.

6. A supporting bracket in accordance with claim 1 wherein said first receptor means is positioned so that when said base portion is mounted on a planar surface, said longitudinal axis of said first receptor means will form an approximately 45 degree angle with respect to that planar surface.

[7. A supporting bracket in accordance with claim 1 wherein said second receptor means is positioned so that when said base portion is mounted on a planar surface, said longitudinal axis of said second receptor means will form an approximately a 90 degree angle with respect to first planar surface.]

8. A supporting bracket in accordance with claim 1 wherein said mouth portion of said first receptor means and said second receptor means are both one inch in diameter, and wherein said mouth portion of said third receptor means is ¼ inch in diameter.

9. A supporting bracket in accordance with claim 1 wherein said mouth portion of said second receptor means extends laterally from said first receptor means.

10. A supporting bracket in accordance with claim 1 wherein said first receptor means and said second receptor means share a common anchor portion within said base portion.

11. A supporting bracket in accordance with claim 9 wherein said third receptor means is located on the opposite side of said first receptor means from said mouth portion of aid second receptor means.

12. A supporting bracket in accordance with claim 1 further comprising a set screw located at said anchor portion of said first and second receptor means for securing the shaft of the hanging decor in position when a shaft is in said receptor means and said set screw is tightened.

13. A supporting bracket for hanging decor such as decorative flags, banners, windsocks, and planters, and for being mounted on a generally planar surface, said bracket comprising:

a base portion containing a means for mounting said base portion on said planar surface;

first elongate receptor means adjacent said base portion having a tubular framework for receiving a cylindrical hanging decor supporting shaft therein, said receptor means having its longitudinal axis oriented at approximately a 45 degree angle with respect to said base portion and so that its longitudinal axis is also oriented at approximately a 45 degree angle with respect to said planar surface upon which said base portion is mounted;

second elongate receptor means adjacent said base portion having a tubular framework for receiving a cylindrical hanging decor supporting shaft therein, said receptor means having its longitudinal axis oriented at [approximately a 90 degree] *an obtuse* angle with respect to said base portion and said planar surface;

said first and second receptor means each comprising a respective anchor portion located in said base portion of said bracket and a respective mouth portion located longitudinally outwardly from said anchor portion; and third elongated receptor means adjacent said base portion and parallel with the longitudinal axis of said first receptor means, and opposite said second receptor means, and having a respective anchor portion and a respective mouth portion, and wherein said third anchor portion and said third mouth portion are smaller than said mouth and anchor portions of said first and second receptor means, and wherein said third receptor means has a tubular framework for receiving a third, smaller, cylindrical hanging decor support shaft therein.

14. A supporting bracket in accordance with claim 13 wherein said bracket is comprised of an aluminum alloy.

15. A supporting bracket in accordance with claim 13 wherein said base portion has a flat face for being mounted flush against a planar surface.

16. A supporting bracket in accordance with claim 13 wherein said mounting means comprises a plurality of screw holes located on said base portion.

17. A supporting bracket in accordance with claim 13 wherein said mouth portion of said first receptor means and said second receptor means are both one inch in diameter, and wherein said mouth portion of said third receptor means is ¼ inch in diameter.

18. A supporting bracket in accordance with claim 13 wherein said mouth portion of said second receptor means extends laterally from said first receptor means.

19. A supporting bracket in accordance with claim 13 wherein said first receptor means and said second receptor means share a common anchor portion within said base portion.

20. A supporting bracket in accordance with claim 13 further comprising a set screw located at said anchor portion of said first and second receptor means for securing the shaft of the hanging decor in position when a shaft is in said receptor means and said set screw is tightened.

*21. A supporting bracket for hanging decor such as decorative flags, banners, windsocks, and planters, and for being mounted on a generally planar surface, said bracket comprising:*

*a base portion including means for mounting said base portion on said planar surface;*

*first elongate receptor means adjacent said base portion for receiving a hanging decor supporting shaft therein, said first receptor means having its longitudinal axis oriented obliquely with respect to said base portion and so that its longitudinal axis is also oblique to the surface upon which said base portion is mounted;*

*second elongate receptor means adjacent said base portion for receiving a hanging decor supporting shaft therein, said second receptor means having its longitudinal axis oriented obliquely with respect to said base portion and with respect to the planar surface, but at a different angle than said first receptor means; and*

*said first and second receptor means each comprising a respective anchor portion located in said base portion of said bracket and a respective mouth portion located longitudinally outwardly from said anchor portion, the first receptor means and the second receptor means sharing a common anchor portion.*

*22. The supporting bracket of claim 21 wherein said base portion has a flat face for being mounted flush against a planar surface.*

*23. The supporting bracket of claim 21 wherein said mounting means comprises a plurality of screw holes located on said base portion.*

*24. The supporting bracket of claim 21 wherein each of said first and second elongated receptor means comprises a tubular framework for receiving a cylindrical hanging decor supporting shaft therein.*

*25. The supporting bracket of claim 21 wherein said first receptor means is positioned so that when said base portion is mounted on a planar surface said longitudinal axis of said first receptor means will form an approximately 45 degree angle with respect to that planar surface.*

*26. The supporting bracket of claim 21 further comprising a set screw located at said anchor portion of said first and second receptor means for securing the shaft of the hanging decor in position when a shaft is in said receptor means and said set screw is tightened.*

*27. The supporting bracket of claim 21 wherein said mouth portion of said second receptor means extends laterally from said first receptor means.*

*28. A supporting bracket for hanging decor such as decorative flags, banners, windsocks, and planters, and for being mounted on a generally planar surface, said bracket comprising:*

*a base portion containing a means for mounting said base portion on said planar surface;*

*first elongate receptor means adjacent said base portion having a tubular framework for receiving a cylindrical hanging decor supporting shaft therein, said first receptor means having its longitudinal axis oriented at approximately a 45 degree angle with respect to said base portion and so that its longitudinal axis is also oriented at approximately a 45 degree angle with respect to said planar surface upon which said base portion is mounted;*

*second elongate receptor means adjacent said base portion having a tubular framework for receiving a cylindrical hanging decor supporting shaft therein, said second receptor means having its longitudinal axis oriented at a different oblique angle with respect to said base portion and said planar surface; and*

*said first and second receptor means each comprising a respective anchor portion located in said base portion of said bracket and a respective mouth portion located longitudinally outwardly from said anchor portion, the first receptor means and the second receptor means sharing a common anchor portion.*

*29. The supporting bracket of claim 28 wherein said mouth portion of said second receptor means extends laterally from said first receptor means.*

*30. The supporting bracket of claim 28 further comprising a set screw located at said anchor portion of said first and second receptor means for securing the shaft of the hanging decor in position when a shaft is in said receptor means and said set screw is tightened.*

*31. The supporting bracket of claim 28 wherein said base portion has a flat face for being mounted flush against a planar surface.*

*32. The supporting bracket of claim 28 wherein said mounting means comprises a plurality of screw holes located on said base portion.*

* * * * *

UNITED STATES PATENT AND TRADEMARK OFFICE

CERTIFICATE OF CORRECTION

PATENT NO. : RE35,731
DATED : February 17, 1998
INVENTOR(S) : Robert L. Lach

It is certified that error appears in the above-indentified patent and that said Letters Patent is hereby corrected as shown below:

Column 1, line 45, "bag" should read --base--.

Column 5, line 28, "aid" should read --said--.

Signed and Sealed this

Thirtieth Day of June, 1998

*Attest:*

*Attesting Officer*

Bruce Lehman

BRUCE LEHMAN

*Commissioner of Patents and Trademarks*